United States Patent [19]

Bray, Jr.

[11] Patent Number: 4,645,126
[45] Date of Patent: * Feb. 24, 1987

[54] COLD WEATHER FLUIDIC WINDSHIELD WASHER METHOD

[75] Inventor: Harry C. Bray, Jr., Laurel, Md.

[73] Assignee: Bowles Fluidics Corporation, Columbia, Md.

[ * ] Notice: The portion of the term of this patent subsequent to Aug. 7, 2001 has been disclaimed.

[21] Appl. No.: 606,554

[22] Filed: May 7, 1984

Related U.S. Application Data

[62] Division of Ser. No. 959,112, Nov. 8, 1978, Pat. No. 4,463,904.

[51] Int. Cl.⁴ .............................................. B05B 1/08
[52] U.S. Cl. .................................. 239/11; 239/284.1
[58] Field of Search ............ 239/11, 101, 102, 284 R, 239/589–590.5, DIG. 3; 137/808–812, 815, 833, 835–839

[56] References Cited

U.S. PATENT DOCUMENTS

| Re. 27,938 | 3/1974 | Bauer | 239/102 |
| 3,423,026 | 1/1969 | Carpenter | 239/101 X |
| 3,998,386 | 12/1976 | Viets et al. | 239/102 |
| 4,052,002 | 10/1977 | Stouffer et al. | 239/101 X |
| 4,151,955 | 5/1979 | Stouffer | 239/11 |
| 4,157,161 | 6/1979 | Bauer | 239/11 |
| 4,463,904 | 8/1984 | Bray | 239/284 R |

Primary Examiner—Johnny D. Cherry
Attorney, Agent, or Firm—Jim Zegeer

[57] ABSTRACT

Liquid fan spray system for cyclically deflecting a liquid jet between extreme positions defined by a pair of end walls is assured of cold weather operation by expanding the liquid power jet. In the preferred embodiment, one boundary wall of the oscillator is tapered about 5° from the power nozzle to the outlet throat, and the outlet or throat has the substantially same cross-sectional area maintained for a given oscillatory angle by closing down the lateral extremities of the outlet throat. This assures cold weather starting when the liquid has increased surface tension and viscosity while at the same time maintaining essentially the same fan angle of the cyclically deflected power jet. The invention is particularly useful in providing all weather oscillation in windshield washer systems for automobiles.

2 Claims, 7 Drawing Figures

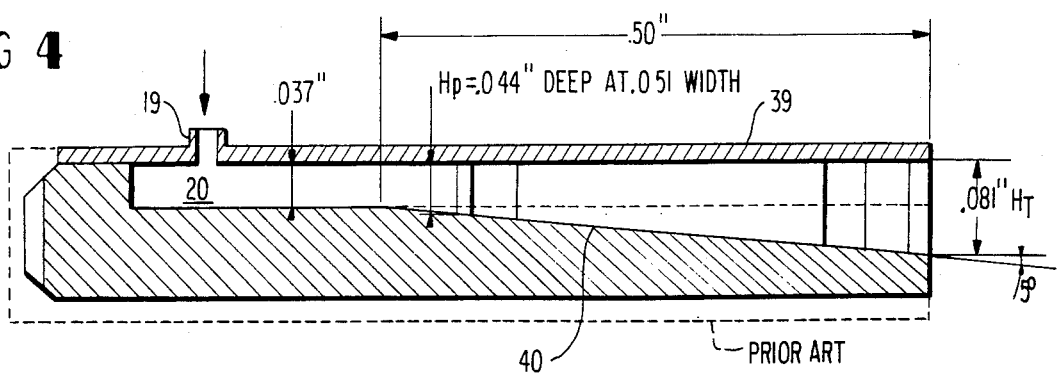
FIG 4 — PRIOR ART
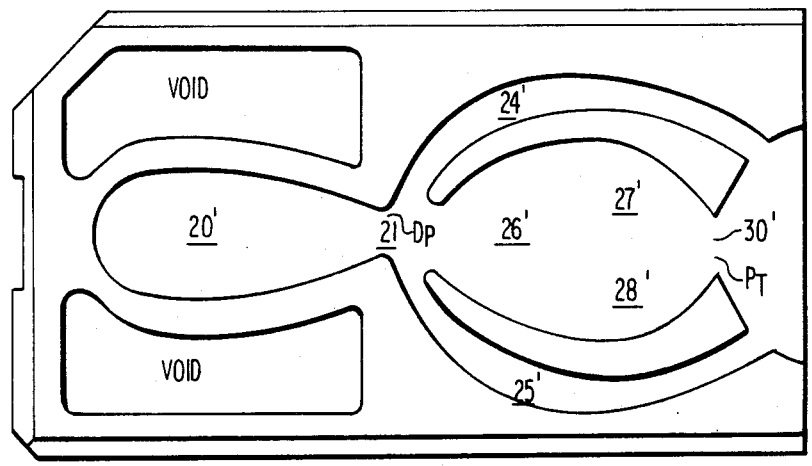
FIG 5
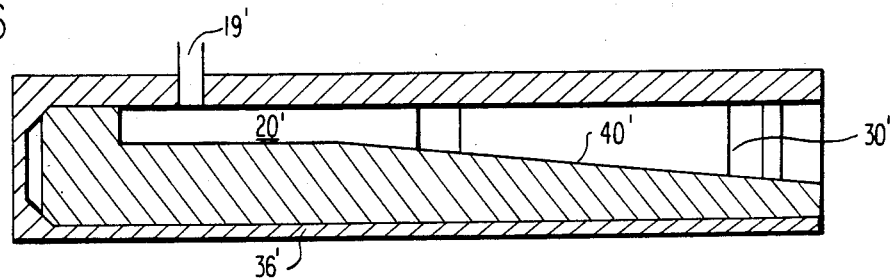
FIG 6
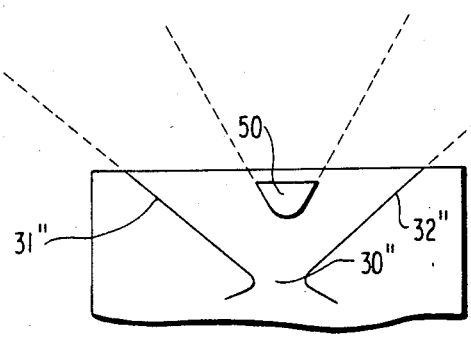
FIG 7

COLD WEATHER FLUIDIC WINDSHIELD WASHER METHOD

This is a divisional of application Ser. No. 959,112, filed Nov. 8, 1978, now U.S. Pat. No. 4,463,904.

BACKGROUND OF THE INVENTION

The invention is particularly applicable to windshield washer systems for automobiles but is not limited to that art area. In Bauer application, U.S. Ser. No. 618,252, filed Oct. 16, 1975 now U.S. Pat. No. 4,157,161, issued June 5, 1979 and assigned to the assignee hereof, various forms of liquid fan spray generation systems are disclosed, including, one as disclosed in U.S. Pat. No. 4,052,002, assigned to the assignee hereof, of which the inventor hereof is a co-inventor, and incorporated herein by reference. In such fluidic oscillation systems, the distance between the power nozzle (e.g., the entrance aperture for the power jet) and the outlet or throat area of the system (e.g., the exit aperture) and the raio of the cross-sectional area of the power nozzle to the outlet throat area control the fan angle. The distance between the power nozzle and the throat is a function of the fan angle, the fan angle being inversely related to that distance. Thus, if the fan angle is selected, then the area ratio of the throat outlet to the power nozzle is established. For example, the cross-sectional area of the output throat should be approximately two and one-half times the area of the power nozzle. However, in the oscillator as shown in U.S. Pat. No. 4,052,002 as well as conventional fluidic oscillators, the liquid jet from the power nozzle must fill up the cavity in order to set up alternate vortices in the interaction region. Initially, a coherent fluid jet travels from the power nozzle through the throat in a straight stream. The power jet must therefore expand sufficiently to fill the throat before the interaction region and the oscillation feedback channels begin to fill. Vortices are formed on either side of the jet of the fluidic oscillator but two vortices cannot exist simultaneously with equal intensity. Thus, as one vortex becomes dominant, the power stream will be diverted against the opposite wall and the oscillation begins.

The power jet velocity at which the throat is filled is the threshold velocity level and is directly proportional to threshold pressure level. When the weather turns cold, the surface tension and viscosity of the fluid increase so the cold fluid power jet does not expand readily so as to fill the cross-sectional area of the throat or outlet. In such case, no fan spray develops and the power jet stream passes through the outlet throat to impinge directly on the windshield. An increase in the velocity (an increase in the threshold pressure) by increasing pump pressure will provide the additional expansion and may be implemented to start the oscillation, but it may not be successful in producing, for example, a full fan angle. However, these same factors, i.e., increased surface tension and viscosity influence the fluid velocity as the pump will deliver a lower pressure fluid for the same energy input level.

Without the invention hereof, the same fluid (water plus an antifreeze, in a ratio of 50:50; $CH_3O_8$—$H_2O$ at 3 CP (centipoise)) at 0° F., the threshold pressure for oscillation is greater than 30 pounds per square inch. With the invention hereof, the same fluid at 0° requires a threshold pressure of about equal to or somewhat greater than three pounds per square inch in a fluidic oscillator of the same character and size. Thus, according to the present invention, the same oscillator geometry or silhouette has increased or improved cold start oscillation capabilities while at the same time maintaining the low pressure start capabilities, and avoids the use of a large pump.

According to the invention, the cross-sectional area of the outlet throat is maintained substantially constant but the height to width ratio of the throat (the aspect ratio (H/W)) is increased (by increasing H and diminishing W) while maintaining the cross-sectional area substantially constant. Whereas the cross-section of the throat outlet approaches a square while maintaining substantially the same area, the cross-section of the power nozzle remains essentially the same. The fan pattern angle is proportional to the ratio of the throat area to the power nozzle and by increasing the aspect ratio, there is a reduction in the outlet throat width so that the jet does not need to expand as must to fill the throat. All of this leads to a greatly improved cold weather starting capability for the oscillator. In the absence of the present invention, cold weather oscillation is substantiallly reduced and/or eliminated so that only a single concentrated jet stream impinges upon the windshield of an automobile, for example.

BRIEF DESCRIPTION OF THE DRAWINGS

The above and other objects, advantages and features of the invention will become more apparent when considered with the accompanying drawings wherein:

FIG. 4 is a cross-sectional view taken on lines 4—4 of FIG. 3 showing taper to the lower wall or boundary and the secondary stream expansion according to the invention;

FIG. 5 is a top view of a silhouette of an oscillator as disclosed in U.S. Pat. No. 4,052,002 and incorporating the invention;

FIG. 6 is a cross-sectional view taken on lines 6—6 of FIG. 5; and,

FIG. 7 illustrates a single fluidic device for providing a dual spray angle with an overall spray angle of 110° and a 30° splitter in the middle of the pattern so as to provide two individual streams of about 40° in width at the extreme ends of the pattern which reduce wind effects and directs the fluid to the area of the windshield where it is more needed.

DETAILED DESCRIPTION OF THE INVENTION

Figure 1:
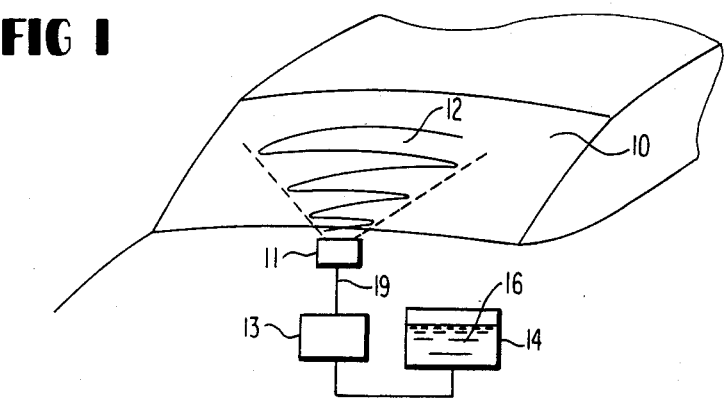
FIG. 1 is a diagrammatic sketch of an automobile windshield washer system to which the invention has been applied.

Referring to FIG. 1, an automobile windshield 10 is provided with a fan spray device 11 which issues a fan spray 12 of proper droplet size and sweep frequency. Washing fluid for this spray 12 is provided by pump 13 from reservoir 14, which would conventionally be under the hood of the automobile. The fluid 16 in reservoir 14 is subject to temperature variation and, usually is a mixture of water and an antifreeze with a cleansing compound included therein.

Figure 2:
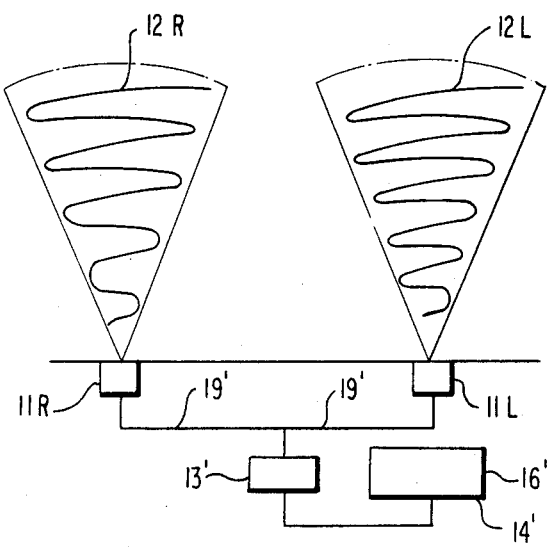
FIG. 2 is a diagrammatic sketch of a similar system wherein a dual fan spray is utilized.

The fan angle illustrated in FIG. 1 is about 95°, but it will be appreciated that a larger or smaller fan angle may be incorporated in the invention depending upon the parameters discussed later hereafter. However, for a single device 11 to fully and adequately cover the windshield of an automobile, the spray angle or fan angle should be at least be approximately 95°. It will be appreciated that the further the nozzle is away from the windshield, a smaller fan angle can cover a larger windshield area. In FIG. 2, fluid 16' from reservoir 14' is supplied to pump 13' which delivers the fluid under pressure to a pair of devices 11R and 11L (for the right and left sides of the windshield of the vehicle). In this case, the fan angles are approximately 45° more or less. As shown in FIG. 7 hereof, a single device 11 may be utilized to provide a dual spray on the windshield and incorporating the cold weather starting principles of the present invention.

Figure 3:
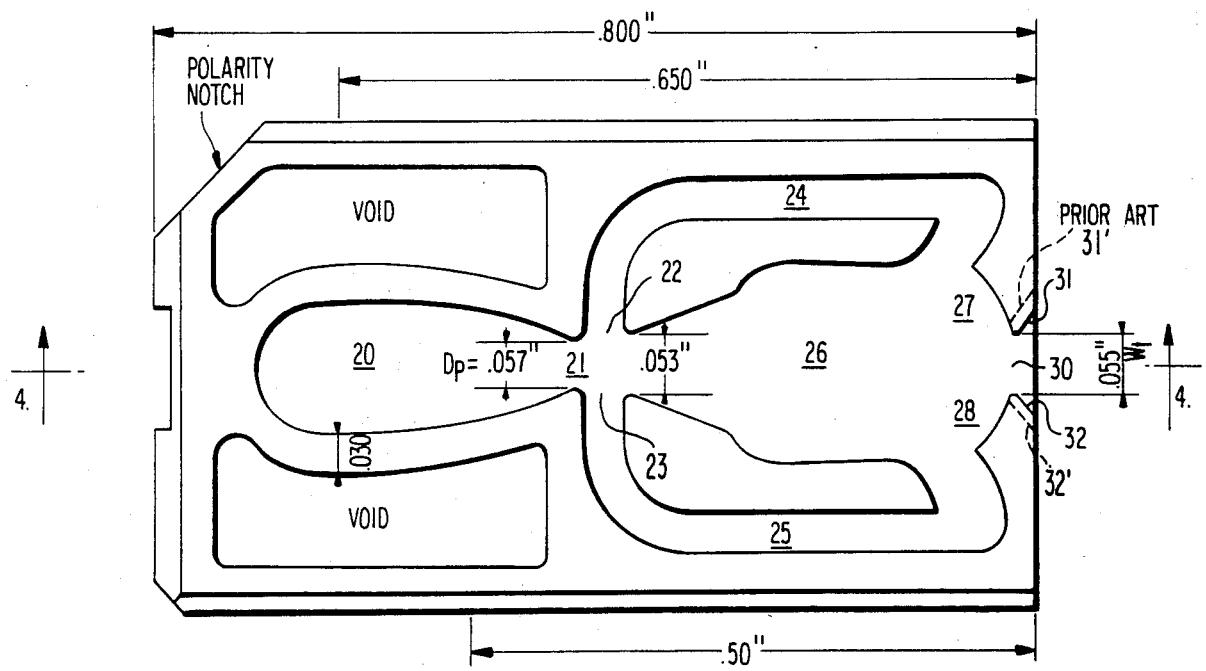
FIG. 3 is the silhouette of a fluidic oscillator incorporating the invention.

Referring now to FIG. 3, the washing fluid is led to power nozzle supply 20 from the pump reservoir and from supply 20 the fluid is directed through a power nozzle 21 having a width $D_p$ (exemplary preferred dimensions are illustrated on the drawings). The fluid issuing through power nozzle 21 is directed in a power jet stream past control signals from a pair of control ports 22, 23 of feedback or control passages 24, 25, respectively into an interaction region 26. Upper or cover plate 39 is secured to the upper confronting edges of the silhouette, the "voids" are to reduce the volume of material in the body member, but in a preferred embodiment, the device of FIG. 3 is a planchette inserted into a housing indicated in dotted outline in FIG. 4. Interaction region 26 is provided at each side with a pair of vortex sections 27, 28 in advance of the outlet throat 30. Throat 30 has a width $W_t$ and a pair of flaring side walls 31, 32. The dotted lines 31' and 32' indicate the prior art position of the walls 31 and 32 with the non-tapered prior art floor shown in dotted outline in FIG. 3. The "polarity notch" shown in FIG. 4 assures proper orientation in the housing. In non-cold weather fan spray fluidic device prior to the present invention, walls 31 and 32 constitute a pair of end walls which structurally define the outer limits of the fan spray. A pair of the feedback passages 24 and 25 are integrally formed in the body member and operate as conventional fluidic oscillator feedbacks providing a sweeping or swept jet which is bounded by walls 31 and 32. As described above, the ratio of the area of throat 30 to the area of power nozzle 21 defines the fan angle. In the present construction and with the given preferred exemplary dimensions, with a fan angle of about 95°, the outlet area is approximately two and one-half times the area of the power nozzle.

In the case of cold weather operation, the power jet from nozzle 21 initially travels from the power nozzle through throat 30 in a straight stream. As described earlier, the power jet must expand sufficiently to fill the throat 30 before the interaction region 26 and feedback or control channels 24 and 25 can begin to fill. Vortices are then formed on either side of the jet in the regions 27, 28 and as one vortex becomes dominant, the power stream will be diverted against the opposite wall, positive feedback occurs and oscillation begins. The power jet velocity at which the throat is filled is the threshold velocity and this is proportional to the threshold pressure level. Because of the increased surface tension and viscosity, a cold fluid power jet will not expand as readily. Increase in velocity by increasing the threshold pressure by increasing the size and/or energy delivered to the pump described in FIGS. 1 and 2 may be incorporated to start oscillation. However, this means that a larger pump must be incorporated in the system.

The present invention, avoids the necessity of increasing the size of the pump by (1) changing the aspect ratio ($H_t/W_t$) of the throat and (2) introducing a secondary flow pattern to expand the power jet before it reaches the throat. As shown in FIG. 4, the bottom wall 40 (it could just as well be the upper wall of cover 39 or a combination of the two) has taper incorporated in it. At the same time, the width W of the throat is reduced to the area shown in the full lines of FIG. 3. The range of taper angles found most suitable to accomplish the objective ranges from about 1° to about 10°. Five degrees (5°) has been found to be most acceptable since the taper angle is a function of the distance between the power nozzle 21 and the throat or the outlet 30. In other words, the objective is to assure that the throat is narrowed (W) but that the cross-sectional area thereof remains essentially the same with a given width $W_p$ and height $H_p$ of a power nozzle 21. The taper angle is inversely related to the distance between the power nozzle and the throat, the larger the distance, the smaller the angle and the smaller the angle the larger the distance—the objective being to maintain the ratio of the cross-sectional area outlet 30 to power nozzle 21 constant since that parameter determines the width of the fan angle. As shown in FIG. 4, lower wall 40 is tapered at an angle of about 5° which, for a 95° fan angle is found to provide satisfactory cold weather starting operation as well as, of course, operating quite satisfactorily in warm weather. It will also be evident that the changes in the aspect ratio (the height $H_t$ to width $W_t$ of the throat) means that the jet need not expand as much to fill the throat. It is a combination of these factors which provides the enhanced cold weather operation.

In constructing the structure illustrated in FIGS. 3 and 4, various techniques in molding and/or casting of plastic or metal may be used to form the silhouette illustrated. If formed in two (or more) parts as illustrated, as long as good sealing technique is incorporated between confronting halves, the device can be taken apart for cleaning. It is preferable that a filter be utilized so as to avoid the necessity of cleaning the device.

Referring now to FIG. 5, a form of oscillator as shown in U.S. Pat. No. 4,052,002, is depicted and incorporates the tapering wall of the present invention. In this case, it is significant to note that the entrance passages to the feedback channels is downstream of the throat and hence, a different oscillatory system as fully described in detail in the above-mentioned U.S. Pat. No. 4,052,002 takes place. It will be appreciated that the taper angle of 5° is essentially the same in this case since the length of the device, the fan angle and the ratio of the power nozzle cross-sectional area to the outlet throat cross-sectional area are essentially the same as illustrated in FIG. 4. However, I wish it to be clearly understood that the invention is not restricted to these particular dimensions or ratios and that various other forms of the invention may be utilized. For example, instead of a smoothly tapering bottom wall, combinations of stepped bottom wall which permits an expansion of the power jet in advance of reaching the throat area is contemplated. Alternatively, one or more steps could be incorporated in both the upper and lower fluid bounding walls of the unit to achieve the desired effect. As discussed above, the increase in height $H_t$ of the throat outlet is accompanied by a corresponding decrease in the width $W_t$ of the outlet throat so as assure that the aspect ratio ($H_t/W_t$) is increased but that the ratio of the cross-sectional area of the throat to the cross-sectional area of the power nozzle is maintained substantially constant for a given oscillator.

FIG. 7 shows the introduction of a splitter 50 sufficiently beyond the output throat region that it does not constitute an impedance and does not interfere with oscillatory action, and is incorporated to the purposes of splitting the output fan into two separate fan sections for directing washing fluid to desired areas of the windshield and avoiding wasting of cleaning fluid, on areas where the mirror may be mounted for example. The positioning of the splitter 50 beyond or downstream of the outlet throat does not modify or in any way change the cold weather starting feature of this invention.

While I have described and illustrated one specific embodiment of the invention, it is clear that various modifications, obvious to those skilled, may be incorporated in the invention without departing from the true spirit and scope thereof as set forth in the appended claims.

What is claimed is:

1. In a method of manufacturing a windshield washer spray device for automobile windshield washer systems having a pump of a predetermined size supplying washer fluid from a reservoir to a fluidic oscillator device, said fluidic oscillator device being constituted by a body member having an oscillation chamber therein, said oscillation chamber having liquid inlet means of predetermined cross-sectional area for receiving washer liquid under pressure and admitting a jet of washer liquid into said chamber and a liquid outlet throat of predetermined cross-sectional area for issuing pressurized liquid from said chamber into an ambient environment and onto an automobile windshield in a fan shaped spray having a predetermined fan angle, said liquid inlet means and said outlet throat being coaxially aligned and having cross-sectional areas related to the fan angle of said fan shaped spray having said predetermined fan angle, the improvement for rendering the initiation of oscillations in said fluidic oscillator device relatively insensitive to ambient weather conditions comprising, increasing the aspect ratio ($H_t/W_t$) of said outlet throat by increasing the height $H_t$ and decreasing the width $W_t$ while maintaining the ratio of the cross-sectional area of said outlet throat to the cross-sectional area of said washer liquid inlet means substantially constant for said predetermined fan angle, and allowing said jet to expand in directions orthogonal to a line passing through said coaxially aligned washer liquid inlet means and said outlet throat so that an expanded jet fills said outlet throat.

2. A windshield washer method utilizng a fluidic oscillator device having a body member having the following volumetric regions therein, an interaction region having an upstream end and a downstream end and left and right side walls which first diverge from said upstream end and then curve to converge towards said downstream end to define an outlet throat at said downstream end, a power nozzle adapted to issue a jet of windshield washer fluid under pressure through an entrance aperture into the upstream end of said interaction region, left and right control means extending between the upstream end and a downstream end of fluid passing through said fluidic oscillator device to cause the right and left sweeping of said jet of windshield washer fluid and create a fan spray, the improvements for assuring cold fluid oscillation of said fluidic oscillator without increasing the pressure of the jet which comprises expanding the jet issuing from said power nozzle toward said outlet throat in directions transverse of the direction of travel of said jet so the expanded jet is greater in cross-sectional area than said outlet throat and fills said outlet throat to enable said interaction region and said left and right control means to fill with wash liquid and initiate oscillation.

* * * * *